US005857142A

United States Patent [19]
Lin et al.

[11] Patent Number: 5,857,142
[45] Date of Patent: Jan. 5, 1999

[54] ARCHITECTURE AND METHOD FOR PROVIDING INTERACTIVE BROADBAND PRODUCTS AND SERVICES USING EXISTING TELEPHONE PLANT

[75] Inventors: K. David Lin, Boulder; Louis Anthony Cox, Jr., Denver; James H. Starr, Littleton; Margarete A. Ralston, Westminster; Stephen Bulick, Boulder; Gregory J. Beveridge, Thornton, all of Colo.

[73] Assignees: MediaOne Group, Inc., Englewood; US West, Inc., Denver, both of Colo.

[21] Appl. No.: 572,301

[22] Filed: Dec. 14, 1995

[51] Int. Cl.$^6$ .................................................. H04N 7/173
[52] U.S. Cl. ................................ 455/5.1; 455/6.3; 348/12
[58] Field of Search ............................. 455/3.1, 3.2, 4.2, 455/5.1, 6.1, 6.2, 6.3; 348/6, 7, 12, 13; H04N 7/16, 7/173

[56] References Cited

U.S. PATENT DOCUMENTS

| | | | |
|---|---|---|---|
| 5,247,347 | 9/1993 | Litteral et al. | 348/7 |
| 5,341,474 | 8/1994 | Gelman et al. | 348/7 |
| 5,357,276 | 10/1994 | Banker et al. | 348/7 |
| 5,387,927 | 2/1995 | Look et al. | 348/6 |
| 5,437,052 | 7/1995 | Hemmie et al. | 455/5.1 |
| 5,442,390 | 8/1995 | Hooper et al. | 348/7 |
| 5,610,916 | 3/1997 | Kostreski et al. | 348/7 |

FOREIGN PATENT DOCUMENTS

| | | | |
|---|---|---|---|
| 2 272 823 | 5/1994 | United Kingdom | H04N 7/167 |
| WO 95/11569 | 4/1995 | WIPO . | |

OTHER PUBLICATIONS

Calvet, J.D., et al., "Interactive Videocommunication Evolution", 1994, pp. 281–289.
Gelman, A.D., et al., "An Architecture For Interactive Applications", May 23, 1993, pp. 848–852.
Chambers, C. A., "Designing A Set–Top Box Operating System", Jun. 7, 1995, pp. 368–369.

*Primary Examiner*—Chris Grant
*Attorney, Agent, or Firm*—Brooks & Kushman P.C.

[57] ABSTRACT

An architecture for providing interactive broadband products and services uses existing cable and telephone plant. The architecture includes a central office switch in communication with a head-end server and a Customer Premises Equipment (CPE) device such as, for example, a modem emulator, data terminal, set-top terminal or personal computer. The CPE device is provided in communication with the head-end server via cable plant for downstream broadcasts and is further provided in communication with a central office switch via telephone plant for upstream signaling and downstream control messages.

25 Claims, 3 Drawing Sheets

ARCHITECTURE AND METHOD FOR PROVIDING INTERACTIVE BROADBAND PRODUCTS AND SERVICES USING EXISTING TELEPHONE PLANT

TECHNICAL FIELD

The present invention relates generally to broadband products and services and, more particularly, to an improved architecture and method for providing such products and services using existing telephone plant.

BACKGROUND ART

"Broadband" products and services, as they are generally referred to in the art, relate to those services and products which are transmitted using equipment and media which support a wide range of electromagnetic frequencies. For example, any voice communications channel having a bandwidth greater than a voice grade telecommunications channel may be referred to as broadband or wideband. Within the telephone industry, the term "broadband" denotes a very high digital line rate such as the 156 megabits per second (Mb/s) optical line rate of new sonet OC3-level fiber-optic systems.

While interactive broadband services and products are desirable, the new overlay networks necessary for their implementation are today cost prohibitive. Consequently, there exists a need for an interim solution for providing interactive broadband services and products to users which does not require the construction and implementation of an entirely new broadband network. Such an interim solution should utilize the existing network facilities and should not require substantial investment in new equipment or network connections.

DISCLOSURE OF THE INVENTION

It is a principle object of the present invention to provide an improved architecture and method for providing interactive broadband products and services using existing telephone plant.

In carrying out the above stated object, a first embodiment of the architecture of the present invention is provided which includes a head-end server in communication with a Central Office Switch (COS). A Customer Premises Equipment (CPE) device is further provided in communication with the head-end server via cable plant for downstream broadcasts and in communication with the COS via telephone plant for upstream signaling and downstream control messages. The CPE device is preferably, but not necessarily, a set-top terminal, i.e., a "set-top box" which is adapted to communicate with the COS via an Integrated Services Digital Network (ISDN) line or a Plain Old Telephone Service (POTS) line.

Alternatively, the CPE device may be a personal computer adapted to communicate with the COS via a modem on a POTS line. The architecture may further include a gateway in communication with the head-end server and the COS, which includes processing capability to determine and advise the CPE device which frequency it should tune to.

In a second embodiment of the above-described architecture, interactive broadband products and services are provided using a Multichannel Multipoint Distribution System (MMDS). The architecture includes an MMDS transmitter in communication with a COS. A CPE device is also provided in communication with the MMDS transmitter for receiving downstream broadcasts and is further provided in communication with the COS via telephone plant for upstream signaling and downstream control messages. Again, the CPE device is preferably, but not necessarily, a modem emulator or data terminal such as, for example, a set-top box adapted to communicate with the COS via an ISDN or a POTS line. Alternatively, the CPE device may be a personal computer adapted to communicate with the COS via a modem using a POTS line.

In further carrying out the above stated object, a method is described herein for providing interactive broadband products and services using existing cable and telephone plant. The method comprises providing a head-end server and a COS in communication with one another. The method further includes providing a CPE device in communication with the head-end server via cable plant and in communication with the COS via telephone plant. Downstream broadcasts and control messages are sent from the head-end server to the CPE device via the cable plant. Similarly, upstream signals are sent from the CPE device to the head-end server via the telephone plant.

In a third embodiment, a method is described for providing interactive broadband products and services using a Local Multipoint Distribution Service (LMDS). The method comprises providing a LMDS transmitter in communication with a COS. The method further includes providing a CPE device in communication with the LMDS transmitter and in communication with the COS via telephone plant. As in the first embodiment, downstream broadcasts and control messages are sent from the LMDS transmitter to the CPE device. Upstream signals are sent from the CPE device to the LMDS transmitter via the telephone plant. A processor may also be provided in communication with the LMDS transmitter to process the control messages, determine which frequency the CPE device should tune to and generate a corresponding signal for receipt by the CPE device.

The above object and other objects, features, and advantages of the present invention are readily apparent from the following detailed description of the best mode for carrying out the invention when taken in connection with the accompanying drawings.

BEST MODES FOR CARRYING OUT THE INVENTION

Figure 1:
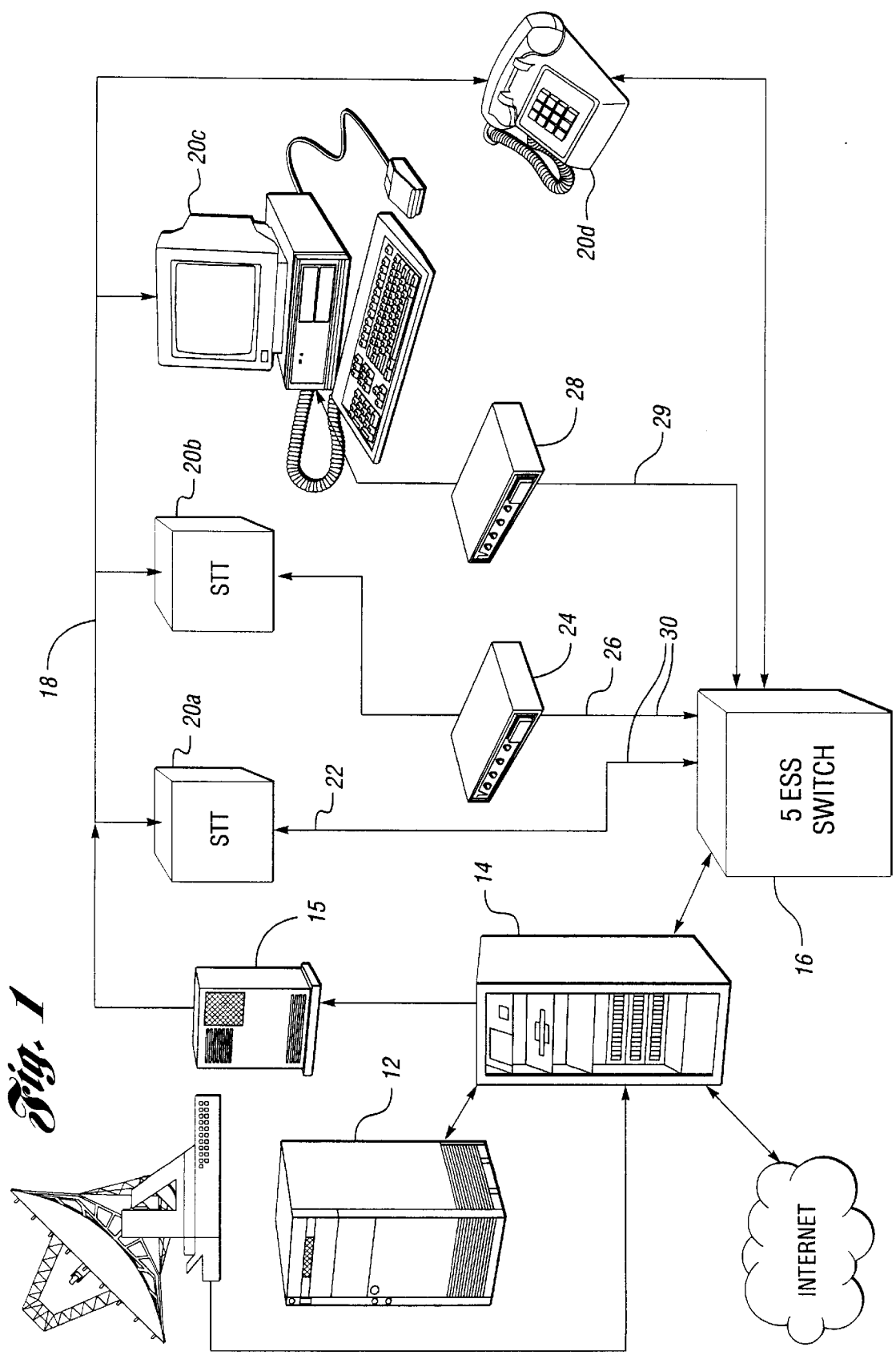
FIG. 1 is a schematic diagram of the architecture of a first embodiment of the present invention.

A first embodiment of the improved architecture of the present invention is shown in FIG. 1 and designated generally by reference numeral 10. Architecture 10 includes a head-end server 12 in communication with a gateway 14. Gateway 14, in turn, is provided in communication with a Central Office Switch (COS) 16 and cable head end 15 via existing cable plant (coaxial cable) 18. Cable head end 15 is similarly provided in communication with a CPE device 20a, 20b or 20c via cable plant 18.

As shown, CPE devices 20a–20c may comprise a modem emulator or data terminal such as, for example, a set-top terminal (20a, 20b) or a personal computer (20c). If the CPE device is a set-top terminal (20a, 20b), it may be connected to central office switch 16 via Integrated Service Digital Network (ISDN) line 22 or via a modem 24 over a Plain Old Telephone Service (POTS) line 26. If the CPE device is a Personal Computer (PC) (20c), it may similarly be connected to COS 16 via an ISDN modem 28 and ISDN line 29. A telephone 20d may also be provided in connection with gateway 14 via coaxial cable 18 and in communication with central office switch 18 via ISDN or a POTS line as described above.

In operation, cable plant 18 provides the downstream broadcast channel from the server 12 to CPE devices 20a–20c. Telephone plant 30 provides the necessary channel for upstream signaling and downstream control messages. Such control messages may include, for example, which frequency the CPE device should tune to receive a desired broadcast. Typically, such control messages are processed at gateway 14.

Figure 2:
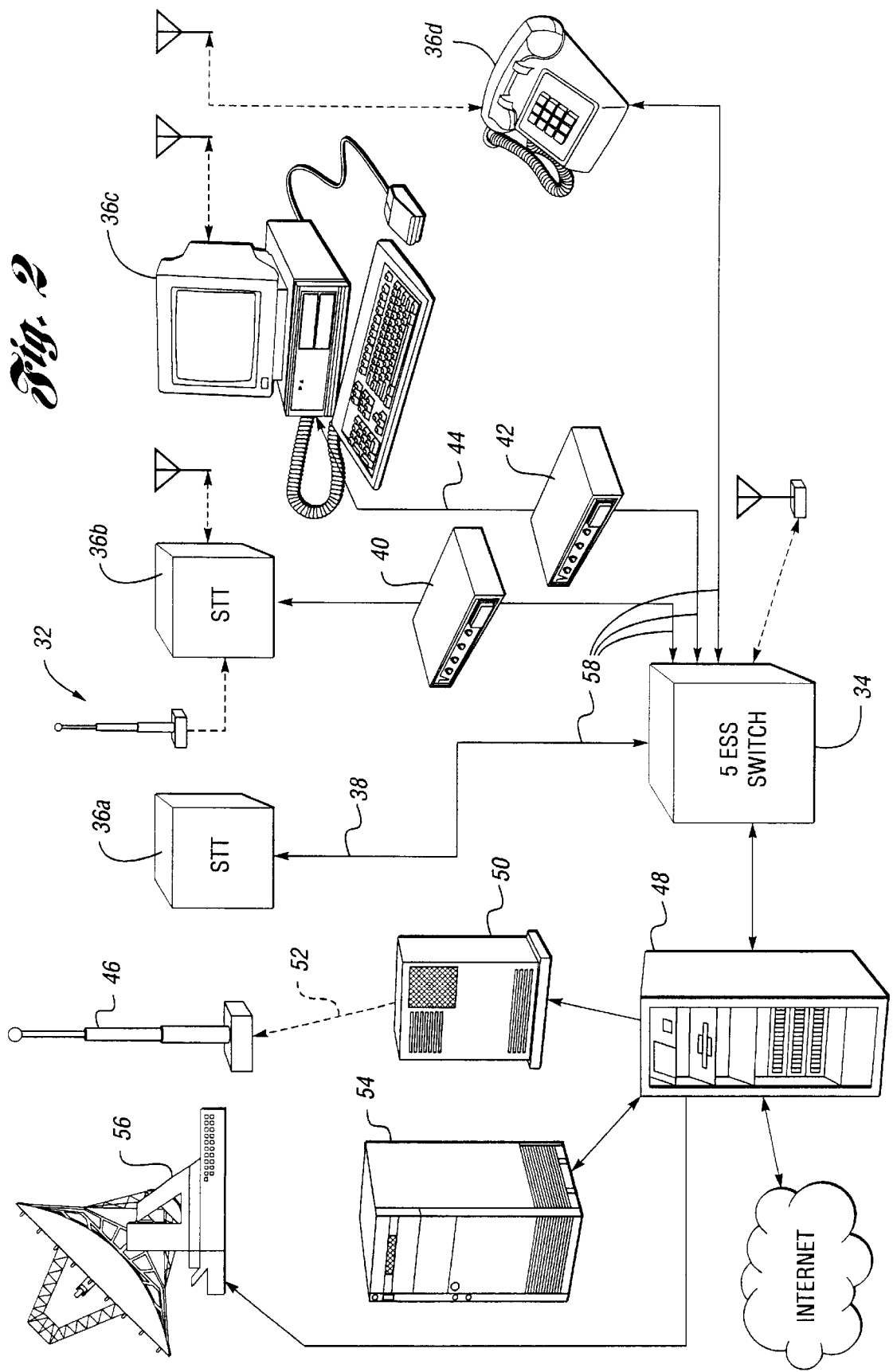
FIG. 2 is a schematic diagram of the architecture of a second embodiment of the present invention.

In an alternative embodiment shown in FIG. 2, an architecture is provided for providing interactive broadband products and services using a Multichannel Multipoint Distribution System (MMDS) as well as existing telephone plant. The architecture is generally referred to by reference numeral 32 and like the architecture of FIG. 1, includes a central office switch 34 provided in communication with a CPE device such as those shown at 36a, 36b, 36c and 36d.

As in the architecture of FIG. 1, CPE devices may be a modem emulator or data terminal such as, for example, set-top terminals as shown at 36a and 36b, a personal computer as shown at or a telephone 36 d. If the CPE device is a set-top terminal (36a, 36b), it may be connected to the central office switch 34 using an ISDN line 38 or a modem 40 with an existing POTS line 42. Alternatively, if the CPE device is a personal computer (36c), an ISDN modem 42 and POTS line 44 may be utilized.

In contrast to the architecture of FIG. 1, in the architecture shown in FIG. 2 an MMDS transmitter 46 is utilized to transmit broadcast data directly to the user's CPE devices (36a–36c). Like the embodiment of FIG. 1 wherein cable head-end 15 is provided in communication with gateway 14 via a wireline connection, cable head-end 50 in FIG. 2 is similarly provided in communication with gateway 48 via a wireline connection. Transmitter 46, however, is provided in communication with cable header 50 via a wireless connection as noted by dashed lines 52. Gateway 48 is, in turn, provided in communication with head end server 54 and DBS 56.

In operation, downstream broadcasts and control messages are broadcast for receipt by the set-top terminal (36a, 36b). Upstream signaling is sent from the set-top terminal to the MMDS transmitter 44 via existing telephone plant 58. Gateway 48 functions to determine and advise CPE devices 36a–36c which frequency to tune to for a desired broadcast.

The above-described network access architecture can also combine 28 GHz LMDS technology with a modified application of ADSL technology as discussed below so as to enable the provisioning of high penetration rate/high bit rate data services in the mass market, at a cost that allows the network provider a competitive challenge to other alternatives, e.g., CATV data modems, etc. The described architecture also maintains the trajectory toward the idealized long-term end-state of an all-fiber architecture.

As those skilled in the art will recognize, the described network architecture is one-way, small-cell LMDS wireless arrangement that carries digitally modulated outbound traffic to inexpensive receivers/demodulators at customer premises, combined with ADSL that transmits a 1.5 MBPS signal from customer premises back toward the serving central office. Placing the ADSL 1.5 MBPS transmitter at a customer premises and eliminating the two-way embedded data channel lowers the cost of the device, and solves several technical problems in the process. Since the ADSL scheme is reversed with no low-level receiver at customer premises, impulse noise and RF interference (EMI) problems are effectively mitigated. This allows the transmitter to be placed and connected to the telephone inside wire anywhere within the residence, requiring at most only a DC block and high pass filter in the ADSL transmitting device. By operating at 1.5 MBPS, the entire practical range of non-loaded copper plant becomes available for assigned-pair provision, covering a majority of the mass market. The remainder of the market requires only one-way line haul at 1.5 MBPS back toward the central office, with no additional source/sink devices (e.g., pair gain systems) in the loop outside plant.

Far-end cross-talk (FEXT) considerations still apply to the architecture with ADSL receivers located at the central office or remote multiplexer location, but overall performance of the link will be much better than the case where the high-bid-rate receivers are located at the customer premises end of the system. FEXT considerations will likely require some automatic adjustment of transmitted power, to maintain like levels among a multiplicity of customer signals entering the twisted pair cable at different points. The principle advantage of this variation on the ADSL concept is the greatly increased likelihood of being able to use all existing loop OSP in its present condition, and meet performance requirements for high-rate data services in the return path.

The LMDS downstream path is contemplated as a small (approximately 500 meters in diameter) cell that typically covers 600–1200 residences. With some 850 MHz of spectrum and a digital modulation scheme with a derated efficiency of at least four bits per Hertz (e.g. 64 QAM), a derived digital capacity of some 3.4 Mbps can be obtained. Dividing by 1000 residences per cell yields some 3.4 Mbps per residence. Taking half of the derived digital capacity for the data service application provides a symmetrical 1.5 Mbps data channel with no concentration to every residence so served by the combination of LMDS and reversed ADSL. The remaining downstream 1.7 Gbps digital bandwidth could be used to deliver some 400 broadcasts MPEG-II video channels compressed to 4 Mbps each. Conversely, cell diameter could increase, or licensed bandwidth could be cut in half, for a data-only service to power PC users.

The LMDS transmitter may be served by a linear optical channel, similar to the feeder arrangement for hybrid fiber coax (HFC) optical nodes. All digital modulation may be accomplished at the serving central office, such that only conversion from optical domain to electrical domain and RF up conversion are required at the base station site. No RF receivers or reverse-path laser transmitters need be used. Some 30 base station sites therefore would be required in a 30,000 line wire center, for full coverage.

As readily seen, benefits to a one-way LMDS vehicle for downstream digital delivery include the elimination of the CPE return path transmitter, cost reduction by eliminating the wireless return channel, and the use of all 850 MHz/licensee anticipated in the FCC's LMDS rule making, for the downstream direction of transmission.

Applicants contemplate that the CPE interface for the data service would be far less expensive and set-top boxes (STB), also called set-top terminals, for digital video applications, due in no small part to the elimination of expensive DRAM which is eliminated for data-only applications. Other versions of set-top boxes could include an MPEG decoding feature that simultaneously delivers a variety of video services to appliances connected to an IF coaxial bus from the 28 Ghz LNB, throughout the residence.

The above-described architecture enables 1.5 Mbps symmetrical data transport service with nearly ideal incremental cost performance for the access component. Moreover, it avoids new digging for existing telephony customers subscribing to the new data service. Still further, it allows migration to either FTTC or HFC long-term architecture and mitigates impulse noise and RF susceptibility problems of "traditional" ADSL architectures. The described architecture further opens up all non-loaded plant for reverse channel data applications, and makes better use of anticipated LMDS spectrum.

Figure 3:
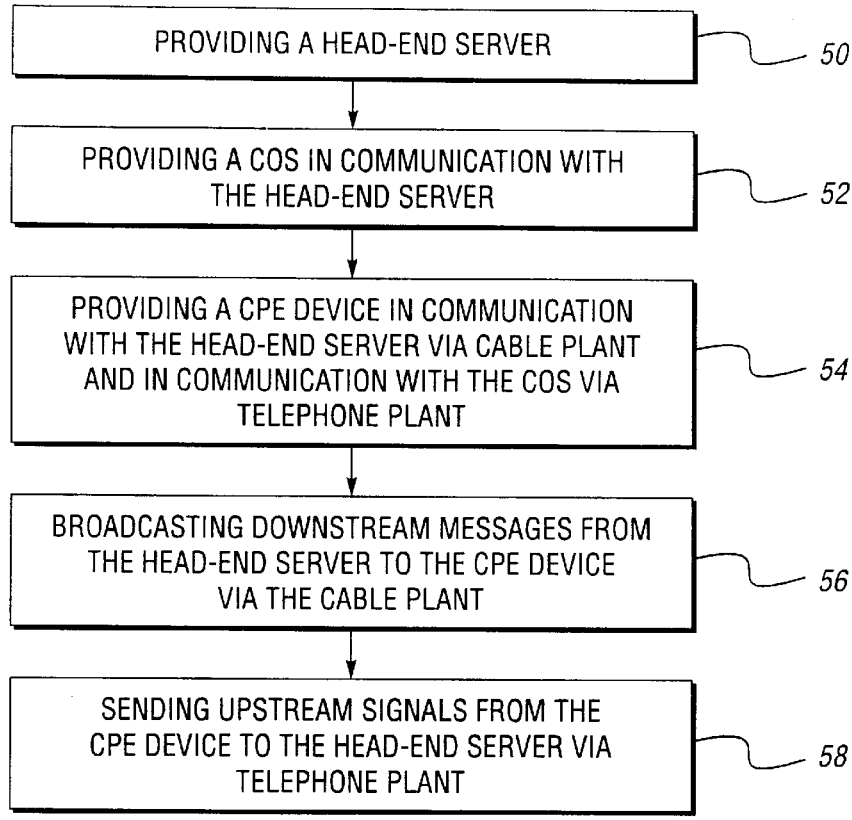
FIG. 3 is a flow diagram of the method of operation of the architecture of FIG. 1.
Figure 4:
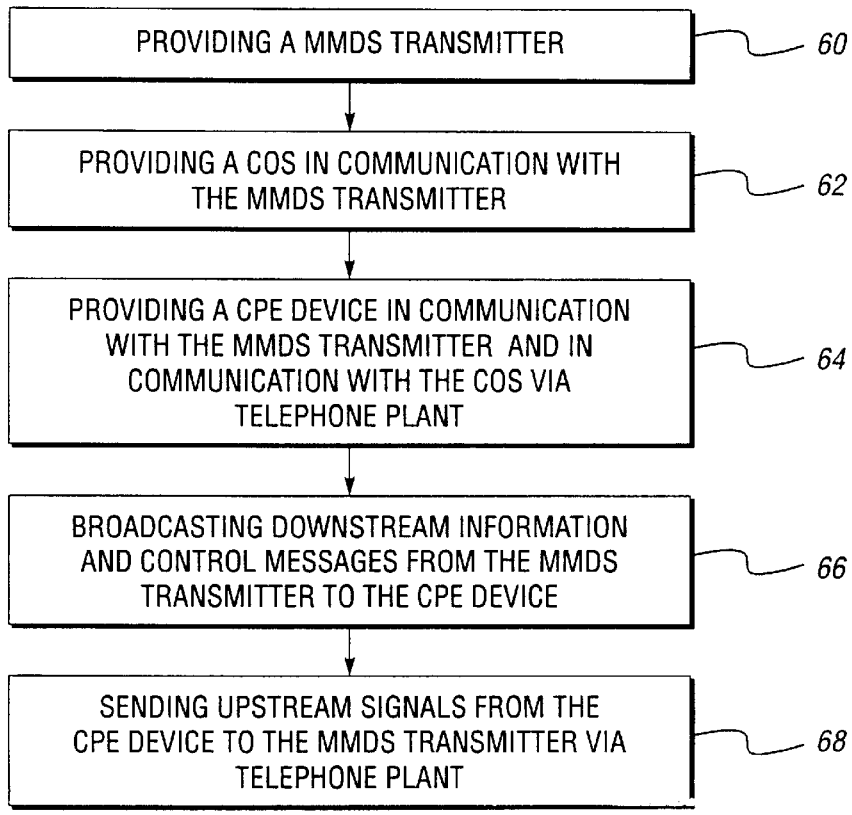
FIG. 4 is a flow diagram of the method of operation of the architecture of FIG. 2.

FIGS. 3 and 4 are respective flow diagrams of the methods of operation of the architecture of FIGS. 1 and 2. As shown in FIG. 3, a method is described for providing interactive broadband products and services using existing cable and telephone plant. The method includes providing 60 a head-end server as well as providing 62 a COS in communication therewith. Still further, the method includes providing 64 a CPE device in communication with the head-end server via cable plant and in communication with the COS via telephone plant. Downstream broadcasts and control messages are sent 66 from the head-end server to the CPE device via the cable plant. Similarly, upstream signals are sent 68 from the CPE device to the head-end server via the telephone plant.

FIG. 4 is similarly directed to a method for providing interactive broadband products and services using a MMDS and existing telephone plant. The method includes providing 70 a MMDS transmitter as well as providing 72 a COS in communication therewith. The method further includes providing 74 a CPE device in communication with the MMDS transmitter and in communication with the COS via telephone plant. Downstream broadcasts and control messages are broadcast 76 from the MMDS transmitter to the CPE device. Upstream signals are similarly sent 78 from the CPE device to the MMDS transmitter via the telephone plant.

While the best modes for carrying out the invention has been described in detail, those familiar with the art to which this invention relates will recognize various alternative designs and embodiments for practicing the invention as defined by the following claims.

What is claimed is:

1. Architecture for providing interactive broadband products and services using existing cable and telephone plant, comprising:
    a head-end server;
    a Central Office Switch (COS) in communication with tile head-end server;
    a set-top terminal in communication with the head-end server via the cable plant for downstream broadcasts and in communication with the COS via an Integrated Services Digital Network (ISDN) telephone line for upstream signaling and downstream control messages; and
    a Gateway in communication with the head-end server and the COS, the Gateway having processing capability to determine which frequency the set-top terminal should tune to.

2. Architecture for providing interactive broadband products and services using a Multichannel Multipoint Distribution System (MMDS) and existing telephone plant, comprising:
    an MMDS transmitter;
    a cable head-end in communication with the MMDS transmitter;
    a Gateway in connection with the cable head-end via the cable plant;
    a Central Office Switch (COS) in communication with the MMDS transmitter; and
    a Customer Premises Equipment (CPE) device in communication with the Gateway via the cable plant for receiving downstream broadcasts and in communication with the COS via the telephone plant for upstream signaling and downstream control messages.

3. The architecture of claim 2, wherein the CPE device is a set-top terminal adapted to communicate with the COS via an Integrated Services Digital Network (ISDN) telephone line.

4. The architecture of claim 2, wherein the CPE device is a set-top terminal adapted to communicate with the COS via a modem using a Plain Old Telephone Service (POTS) line.

5. The architecture of claim 2, wherein the CPE device is a Personal Computer adapted to communicate with the COS via a modem using a Plain Old Telephone Service (POTS) line.

6. The architecture of claim 2, further comprising a processor in communication with the MMDS transmitter, the processor adapted to determine which frequency the CPE device should tune to.

7. A method for providing interactive broadband products and services using existing cable and telephone plant, comprising:
    providing a head-end server;
    providing a Central Office Switch (COS) in communication with the head-end server;
    providing a set-top terminal in communication with the head-end server via the cable plant and in communication with the COS via an Integrated Services Telephone Network (ISDN) telephone line;
    sending downstream broadcasts and control messages from the head-end server to the set-top terminal via the cable plant;
    sending upstream signals from the set-top terminal to the head-end server via the ISDN telephone line;
    providing a Gateway in communication with the head-end server and the COS;
    processing the control messages at the Gateway to determine which frequency the set-top terminal should tune to; and
    generating a corresponding signal at the Gateway for receipt by the set-top terminal.

8. A method for providing interactive broadband products and services using a Multichannel Multipoint Distribution System (MMDS) and existing telephone plant, comprising:
    providing a MMDS transmitter;
    providing a cable head-end in communication with the MMDS transmitter;
    providing a Gateway in communication with the cable head-end via cable plant;
    providing a Central Office Switch (COS) in communication with the MMDS transmitter;
    providing a Customer Premises Equipment (CPE) device in communication with the Gateway via cable plant and in communication with the COS via telephone plant;
    sending downstream broadcasts and control messages from the MMDS transmitter to the CPE device; and sending upstream signals from the CPE device to the MMDS transmitter via the telephone plant.

9. The method of claim 8, wherein the upstream signals are sent on an Integrated Services Digital Network (ISDN) telephone line.

10. The method of claim 8, wherein the upstream signal are sent on a Plain Old Telephone Service (POTS) line.

11. The method of claim 8, further comprising:

providing a processor in communication with the MMDS transmitter;

processing the control messages at the processor to determine which frequency the CPE device should tune to; and generating a corresponding signal at the processor for receipt by the CPE device.

12. An architecture for providing interactive broadband products and services using a telephone plant, comprising:

a head-end server;

a wireless broadcast facility in communication with the head-end server;

a Gateway;

a Customer Premises Equipment (CPE) device in communication with the head-end server via the wireless broadcast facility for downstream broadcasts and in communication with the Gateway via the telephone plant for upstream signaling, wherein the Gateway has processing capability to determine which frequency the CPE device should tune to.

13. The architecture of claim 12, wherein the CPE device is a set-top terminal adapted to communicate with the Gateway via an ADSL transmitter.

14. The architecture of claim 12, wherein the CPE device is a set-top terminal adapted to communicate with the Gateway via a modem using a Plain Old Telephone Service (POTS) line.

15. The architecture of claim 12, wherein the CPE device is a Personal Computer adapted to communicate with the Gateway via a modem using a Plain Old Telephone Service (POTS) line.

16. The architecture of claim 12, wherein the wireless broadcast facility is a satellite transponder.

17. The architecture of claim 12, wherein the wireless broadcast facility is a LMDS transmitter.

18. The architecture of claim 12, wherein the wireless broadcast facility is a MMDS transmitter.

19. The architecture of claim 12, wherein the telephone plant further comprises:

an ADSL transmitter in communication with the CPE; and an ADSL receiver in communication with the ADSL transmitter and the Gateway.

20. A method for providing interactive broadband products and services using an existing wireless broadcast facility and a telephone plant, comprising:

providing a head-end server;

providing a Gateway;

providing a Customer Premises Equipment (CPE) device in communication with the head-end server via the wireless broadcast facility and in communication with the Gateway via the telephone plant;

sending downstream broadcasts and control messages from the head-end server to the CPE device via the wireless broadcast facility;

sending upstream signals from the CPE device to the Gateway via the telephone plant;

processing the control messages at the Gateway to determine which frequency the CPE device should tune to; and generating a corresponding signal at the Gateway for receipt by the CPE device.

21. The method of claim 20, wherein the upstream signals are sent on an ADSL conditioned telephone line.

22. The method of claim 20, wherein the upstream signal are sent on a Plain Old Telephone Service (POTS) line.

23. The method of claim 20, wherein the downstream signal is sent via a satellite transponder.

24. The method of claim 20, wherein the downstream signal is sent via an LMDS transmitter.

25. The method of claim 20, wherein the downstream signal is sent via an MMDS transmitter.

* * * * *

UNITED STATES PATENT AND TRADEMARK OFFICE
CERTIFICATE OF CORRECTION

PATENT NO : 5,857,142
DATED : January 5, 1999
INVENTOR(S) : Lin et al.

It is certified that error appears in the above-identified patent and that said Letters Patent is hereby corrected as shown below:

Column 3, line 30: After "at" insert --36c--

Column 5, line 52: Delete "tile" and insert --the--

Signed and Sealed this

Twenty-second Day of August, 2000

Attest:

Q. TODD DICKINSON

*Attesting Officer*  *Director of Patents and Trademarks*